June 26, 1951  R. GRAY  2,558,246

JOINTING OF METAL INSERTS TO THERMOPLASTIC ARTICLES

Filed Jan. 30, 1947

INVENTOR
ROBIN GRAY

BY
Edward J. Dwyer
ATTORNEY

Patented June 26, 1951

2,558,246

UNITED STATES PATENT OFFICE 2,558,246

JOINTING OF METAL INSERTS TO THERMOPLASTIC ARTICLES

Robin Gray, Clifton Junction, near Manchester, England, assignor to The Electric Storage Battery Co., a corporation of New Jersey Application January 30, 1947, Serial No. 725,349
In Great Britain January 3, 1946

3 Claims. (Cl. 136—168)

1

In non-metallic articles, such as accumulator cell lids and boxes housing electrical apparatus, made in ebonite, phenolic or bituminous compositions, or the like, leak tight joints between said material and fusible metal conductors, e. g. lead battery posts, penetrating the articles, are commonly made by embedding in the article, most usually during molding, a piece or insert of fusible metal, and subsequently effecting a welded joint between this insert and the cell post or other conductor. Such an insert may be tubular, in which case the conductor or post normally passes through it from the interior of the cell and is welded to the insert on the exterior of the cell lid to form a leak-tight joint therewith; alternatively the insert may be solid, in which case the cell post is welded before assembly of the cell to that end of the insert which will be inside the cell, the insert thus becoming part of the conductive path. In either case, other conductors also may be welded to the insert, as for instance in a battery to form inter-cell connections. The use of similar constructions where the lid or other article is made of a thermoplastic material having a low melting temperature, e. g. polystyrene or methyl methacrylate, is an objective to be desired, but hitherto it has proved unattainable or difficult to attain because the heat of welding transmitted through the body of the metal insert tends to melt the matrix material.

The object of our present invention is to overcome this difficulty and to provide a simple and effective way by which welding to such inserts can be effected without damage to the matrix material.

In the case of an accumulator cell lid, it is sometimes advantageous to have the protective sheath extend over or above the upper surface of the lid in the form of a flange or boss $e$ of a diameter sufficient to serve either of two alternative purposes, firstly to carry the so-called "burning ring," which is a ring placed temporarily on the cell lid during welding of a post to the tubular insert, so as to surround and confine the metal whilst it is molten; secondly to hold the inter-cell connector clear of the lid. The flange or boss protects the surface of the lid from heat damage during manufacture, and gives protection against heat generated in the connector by heavy discharge currents. It is sometimes advantageous also to include a similar flange or boss on the other end of the sheath to lie on or project below the under-surface of the lid, so as to interpose a heat-insulating barrier between the lid

2 material and the metal flange which commonly forms part of the cell post as provision to support the lid on the post.

Inserts in accordance with my invention may be incorporated in accumulator lids or other articles by the methods adopted for lead and similar inserts of known types, in particular by moulding the article around the insert, when it will be seen that the sheath interposed between the weldable core and the matrix material of the article protects the latter from excessive heat during subsequent welding operations. I find, however, that it is sometimes advantageous to cool the welded joint by application of water immediately after welding, but in other cases the heat is dissipated by absorption into the relatively large masses of metal in the interior of an accumulator cell.

Referring to the accompanying explanatory drawings.

Figure 1:
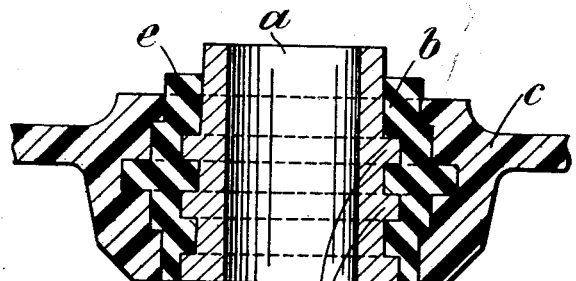
Figure 1 is a sectional elevation of an arrangement in accordance with the invention.
Figure 2:
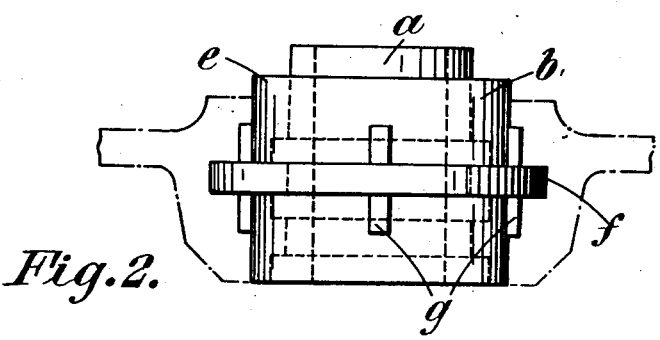
Figure 2 is an elevation of the sheath with insert.
Figure 3:
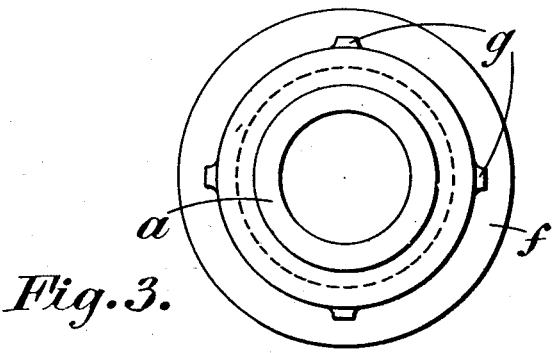
Figure 3 is a plan of the sheath and insert.

The tubular insert is of lead or other suitable metal indicated by $a$. $b$ is a sheath of ebonite, or other heat-resistant material and $c$ is a cell lid, or similar article of thermoplastic material. The insert is formed with ribs $d$ to assist in forming a liquid tight joint with the sheath, and projects from the sheath at one end. The sheath $b$ projects above the lid $c$ thereby providing a heat insulating boss $e$ around the insert $a$. The sheath $b$ also has a circumferential flange $f$ and ribs $g$ to enable it to be firmly held by the lid material when the latter is moulded around it.

In accordance with my invention, the inserts or insert cores $a$ of lead, or of other suitable metal of like fusibility, are made suitable for use as weldable inclusions in battery cell lids, boxes, or other articles of thermo-plastic or otherwise heat-fragile material by forming on the metal inserts a heat-insulating sheath $b$, which makes a liquid-tight joint with the metal. The sheath $b$ must have sufficient thickness to provide the required degree of heat-insulation, depending on the extent of the welding operations to be carried out on the insert $a$ and the critical temperature of the matrix material which is to surround the sheath $b$. The material of the sheath $b$ must also be sufficiently heat-resistant to withstand without damage the heat of the welding operations. Examples of suitable materials are ebonite, thermosetting resins such as phenolics, or high-temperature thermo-plastics.

The sheath $b$ may be formed and sealed to the insert core $a$ by any convenient method, as for instance by extruding it in a plastic state on to a continuous core, the sheathed core being subsequently sub-divided into appropriate lengths, or by shrinking a sheath on to a fusible core; or the core may be forced under pressure into a sheath of substantial dimensions. The method of fabrication I prefer, however, is to mold the sheathing material on to the insert core $a$. This method allows me to shape the exterior of the sheath $b$, as for instance by provision of a circumferential flange $f$, ribbing $g$ or the like, so situated that it will be buried in the lid material $c$ when the latter is molded around the sheathed insert; I thus take advantage of the natural shrinkage of the lid material $c$, during setting and cooling, to give a tight grip on the buried flange $f$ of the sheath $b$ and provide an effectively sealed joint and by providing appropriate ribs $g$ on the sheath $b$ I prevent its rotation. The preferred method also lends itself to economical production, as I may cast the inserts in multiple in the form of a long tube or rod which is placed in one piece in a sheathing mold, wherein the sheaths, singly or in pairs (so that one end of each sub-division of the core will be exposed for welding), spaced along the length of the multiple casting, are molded simultaneously, the casting then being sub-divided as required.

In the case of an accumulator cell lid, it is sometimes advantageous to have the protective sheath extend over or above the upper surface of the lid in the form of a flange or boss $e$ of a diameter sufficient to serve either of two alternative purposes, firstly to carry the so-called "burning ring," which is a ring commonly placed temporarily on the cell lid during welding of a post to the tubular insert, so as to surround and confine the metal while it is molten; secondly to hold the intercell connector clear of the lid. The flange or boss $e$ protects the surface of the lid from heat damage during manufacture, and gives protection against heat generated in the connector by heavy discharge currents. It is sometimes advantageous also to include a similar flange or boss on the other end of the sheath to lie on or project below the under-surface of the lid, so as to interpose a heat-insulating barrier between the lid material and the metal flange which commonly forms part of the cell post as provision to support the lid on the post.

Inserts in accordance with my invention may be incorporated in accumulator lids or other articles by the methods adopted for lead and similar inserts of known types, in particular by molding the article around the insert, when it will be seen that the sheath interposed between the weldable core and the matrix material of the article protects the latter from excessive heat during subsequent welding operations. I find, however, that it is sometimes advantageous to cool the welded joint by application of water immediately after welding, but in other cases the heat is dissipated by absorption into the relatively large masses of metal in the interior of an accumulator cell.

What I claim is:

1. In an electric accumulator the combination comprising a conductor of fusible metal, a thermo-plastic matrix having a melting point lower than the fusion point of said metal having an aperture through which said conductor extends, and means supporting said conductor in said aperture and protecting said matrix when said conductor is fused, said means including a tubular sheath of thermal insulating material joined in liquid tight relation with said conductor and said matrix, the thermal destruction point of said sheath being higher than the fusion temperature of said conductor.

2. The combination as claimed in claim 1 in which the sheath has external circumferential flanges and longitudinal ribs embedded within the material of the matrix.

3. An electric accumulator cell lid of thermo-plastic material having an aperture and selected from the group consisting of polystyrene and methyl methacrylate, a tubular conductor of fusible metal adapted to receive a terminal post and passing through said aperture, means supporting said conductor in said aperture and protecting said cell lid when said conductor is fused, said means including a tubular sheath of thermal insulating material joined in liquid tight relation with said conductor and said cell lid the thermal destruction point of said sheath being higher than the fusion temperature of said conductor.

ROBIN GRAY.

REFERENCES CITED

The following references are of record in the file of this patent:

UNITED STATES PATENTS

| Number | Name | Date |
| --- | --- | --- |
| 1,323,307 | Noble et al. | Dec. 2, 1919 |
| 1,327,542 | Frey | Jan. 6, 1920 |
| 1,907,420 | Finn | May 2, 1933 |
| 2,071,469 | Lormor | Feb. 23, 1937 |
| 2,076,341 | Henry | Apr. 6, 1937 |
| 2,100,921 | Rolph | Nov. 30, 1937 |
| 2,258,218 | Rochow | Oct. 7, 1941 |
| 2,305,150 | Fearon | Dec. 15, 1942 |
| 2,387,590 | Koenig et al. | Oct. 23, 1945 |

FOREIGN PATENTS

| Number | Country | Date |
| --- | --- | --- |
| 297,904 | Great Britain | Oct. 4, 1928 |

OTHER REFERENCES

Vinal, Storage Batteries—3rd Edition 1940, page 60 relied on.

Bakelite, Pamphlet—Bakelite Molding Plastics—copyright 1940 by Bakelite Corp., page 18 relied on.